United States Patent
Oehler et al.

(10) Patent No.: US 9,746,563 B2
(45) Date of Patent: Aug. 29, 2017

(54) WIRELESS LOCAL MESSAGING SYSTEM AND METHOD OF DETERMINING A POSITION OF A NAVIGATION RECEIVER WITHIN A WIRELESS LOCAL MESSAGING SYSTEM

(75) Inventors: Veit Oehler, Neubiberg (DE); Julian Steffes, Munich (DE); Michael Voit Von Voithenberg, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 572 days.

(21) Appl. No.: 14/342,250

(22) PCT Filed: Sep. 1, 2012

(86) PCT No.: PCT/EP2012/003667
§ 371 (c)(1),
(2), (4) Date: Apr. 18, 2014

(87) PCT Pub. No.: WO2013/029802
PCT Pub. Date: Mar. 7, 2013

(65) Prior Publication Data
US 2014/0232594 A1    Aug. 21, 2014

(30) Foreign Application Priority Data
Sep. 1, 2011 (EP) .................... 11007102

(51) Int. Cl.
*G01S 19/13* (2010.01)
*G01S 19/11* (2010.01)
(Continued)

(52) U.S. Cl.
CPC .............. *G01S 19/13* (2013.01); *G01S 19/11* (2013.01); *G01S 19/46* (2013.01)

(58) Field of Classification Search
CPC .......... G01S 19/01; G01S 19/13; G01S 19/03; G01S 19/10; G01S 19/11; G01S 19/38;
(Continued)

(56) References Cited

U.S. PATENT DOCUMENTS 5,874,914 A * 2/1999 Krasner ................. G01S 19/46
342/357.29
6,101,178 A   8/2000 Beal
(Continued)

FOREIGN PATENT DOCUMENTS

| CN | 101690271 A | 3/2010 |
|---|---|---|
| EP | 2 233 943 A1 | 9/2010 |
| WO | WO 2009/069700 A1 | 6/2009 |

OTHER PUBLICATIONS

Russian Office Action issued in Counterpart Application No. 2014112229/07(019190) dated Jun. 1, 2015 (Five (5) pages).
(Continued)

Primary Examiner — Bernarr Gregory
(74) Attorney, Agent, or Firm — Crowell & Moring LLP

(57) ABSTRACT

A wireless local messaging system includes a transmitter transmitting a local message to a navigation receiver configured to receive and process navigation messages from satellites of a global navigation satellite system on a given carrier frequency, each of the satellites transmitting the navigation messages with a satellite-individual PRN code. The transmitter transmits the local message in a local message signal on the given carrier frequency with a local PRN code that is not used by a satellite of the global navigation satellite system, and the receiver receives the local PRN code and processes the local message signal.

13 Claims, 2 Drawing Sheets

Figure 1:
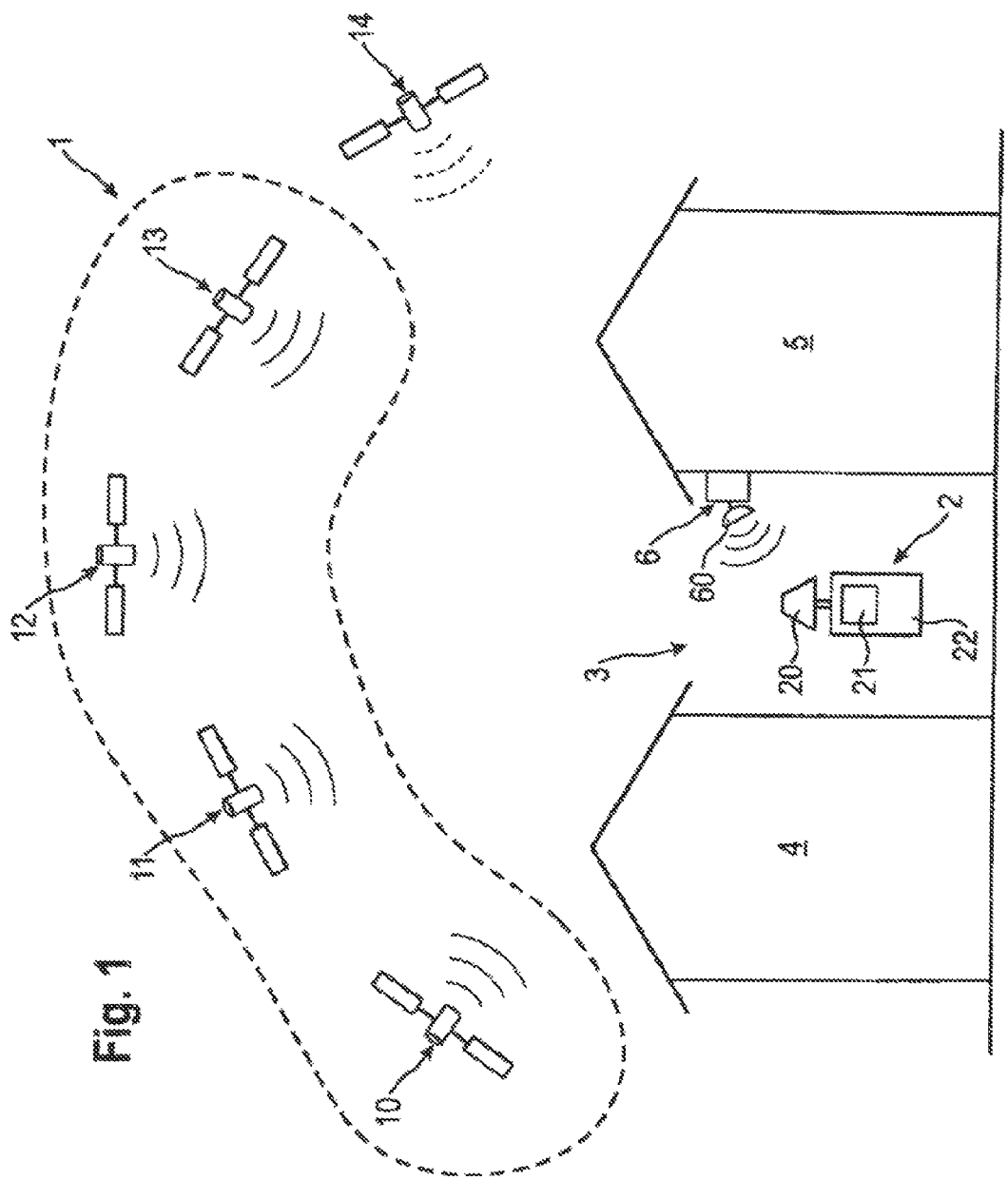

(51) Int. Cl.
   *G01S 19/46*     (2010.01)
   *G01S 19/00*     (2010.01)
(58) Field of Classification Search
   CPC .......... G01S 19/39; G01S 19/42; G01S 19/45;
               G01S 19/46; G01S 19/48; H04W 64/00
   See application file for complete search history.

(56) References Cited

U.S. PATENT DOCUMENTS

| | | | |
|---|---|---|---|
| 6,111,541 A * | 8/2000 | Karmel | G01S 19/48 |
| | | | 342/357.4 |
| 6,597,988 B1 | 7/2003 | Brodie et al. | |
| 7,948,437 B2 * | 5/2011 | Torimoto | G01S 19/11 |
| | | | 342/357.31 |
| 8,041,330 B1 | 10/2011 | Garin | |
| 8,618,978 B2 * | 12/2013 | Torimoto | G01S 19/11 |
| | | | 342/357.31 |
| 2005/0086001 A1 | 4/2005 | Kim et al. | |
| 2005/0227703 A1 * | 10/2005 | Cheng | H04W 64/00 |
| | | | 455/456.1 |
| 2006/0224320 A1 | 10/2006 | Kim et al. | |
| 2010/0222081 A1 | 9/2010 | Ward et al. | |

OTHER PUBLICATIONS

European Office Action dated Dec. 9, 2013 (six (6) pages).
English-language translation of Chinese Office Action dated Mar. 20, 2015 (eighteen (18) pages).
European Search Report dated Jan. 13, 2012 (eight (8) pages).
International Search Report dated Sep. 26, 2012 (three (3) pages).

* cited by examiner

WIRELESS LOCAL MESSAGING SYSTEM AND METHOD OF DETERMINING A POSITION OF A NAVIGATION RECEIVER WITHIN A WIRELESS LOCAL MESSAGING SYSTEM

FIELD OF THE INVENTION

Exemplary embodiments of the present invention are directed to a wireless local messaging system having at least one transmitter and at least one receiver, the at least one transmitter transmitting a local message to the at least one receiver. Exemplary embodiments of the present invention are also directed to a method of determining a position of a navigation receiver within a wireless local messaging system. Exemplary embodiments of the present invention are also directed to a navigation receiver adapted to carry out this method.

In particular the invention relates to a method for providing localization as well as other relevant information on standard mass-market navigation receivers in local environments where the signals transmitted from the satellites of the global navigation satellite system (GNSS) cannot be received or where not enough signals are received to provide navigation information from the satellites of the GNSS.

BACKGROUND OF THE INVENTION

Global navigation satellite systems (GNSS) provide world-wide signals that principally contain distance information, which allows any user who is receiving such GNSS signals for accurate global localization.

Once the GNSS signal reception is disturbed e.g. through walls inside buildings or much reduced in urban canyons, the required information can no longer be provided to the user and the localization based on pure GNSS fails, or is degraded depending on the amount of information that is still received by the navigation receiver or mobile device.

In order to enhance the accuracy of the position determination satellite based augmentation systems (SBAS) are provided that send messages to the navigation receivers on a second frequency band that is different from the first frequency band on which the GNSS signals are transmitted (L1 band). These SBAS messages comprise accuracy information about the navigation information transmitted on the L1 band from the navigation satellites. The SBAS messages are transmitted from satellites other than the GNSS satellites and from ground stations. Known SBAS systems are the North American WAAS system and the European EGNOS system.

Today's mass-market mobile devices typically already include GNSS receivers or in general GNSS chips, and allow for global localization and navigation accordingly, but face the same signal shadowing or blocking situations once operating in relevant severe environments (e.g. indoor).

This problem of suitable GNSS signal and related information acquisition in severe environments could be avoided by providing GNSS-like signals from locally deployed transmitters, so-called Pseudolites (pseudo-satellites), e.g. installed inside a building to allow for local indoor signal tracking. However, the use of pseudolites installed inside a building is difficult due to signal reflections occurring at the walls and ceilings of the building so that a correct navigation result cannot be achieved.

It is thus a problem to navigate with a GNSS navigation device within buildings or within environments in which reflections of GNSS signals or Pseudolite signals occur.

There are also many needs to contact individuals in a certain area, e.g. in order to transmit a warning message, like hurricane warning or fire alarm, or simply a general information like a commercial advertising.

OBJECT OF THE INVENTION

The object of the present invention is to provide information in a local environment, which can be received by standard or mass-market GNSS receivers respectively mobile devices with a minimum upgrade need. Another object of the present invention is to provide a method of determining the position of a navigation receiver or a mobile device with navigation capabilities that also allows navigation in a difficult local environment where no or no sufficient GNSS signals can be received. Furthermore, it is an object of the present invention to provide a navigation receiver adapted to carry out such a method.

SUMMARY OF THE INVENTION

According to the invention, there is provided at least one navigation receiver configured to receive and process navigation messages from satellites of a global navigation satellite system on a given carrier frequency, each of the satellites transmitting the navigation messages with a satellite-individual PRN code. The at least one transmitter is configured to transmit the local message in a local message signal on the given carrier frequency with a local PRN code that is not used by a satellite of the global navigation satellite system. The at least one receiver is further configured to receive the local PRN code and to process the local message signal.

Today, nearly everybody carries a portable communication device like a mobile phone which is equipped with a GNSS receiver. The basic idea of the present invention is thus to enable standard GNSS navigation receivers and mass-market mobile devices with navigation capability to receive local messaging information. This local messaging information is transmitted on the same frequency band that already covers standard GNSS channels and uses information dissemination concepts of the GNSS system for disseminating the messages.

Using these already provided GNSS channels and using the dissemination concepts of GNSS messages for the transmission of the local messaging information from the local transmitters minimizes the impact on standard GNSS receivers and mobile devices. A simple firmware upgrade of these receivers and devices can thus enable the GNSS receivers and mobile devices to receive and process the local messaging information.

Implementation of the invention onto mass-market devices respectively upgrading the relevant GNSS chip firmware, and equipping suitable environments with the new local transmitter infrastructure, enables many various location based services without the need for extensive additional investments. Furthermore critical information, e.g. security relevant local data, can be visualized on those mobile devices in real-time, further extending the area of consideration for the present invention from commercial to safety critical applications and services.

In a first preferred embodiment of the messaging system according to the invention the local message signal is a non-continually transmitted pulsed signal. This pulsed transmission of the local position information allows the GNSS navigation receivers to receive standard GNSS navigation information from the satellites in addition to the local message signal transmitted from the local transmitters.

It is particularly advantageous when at least one database unit is provided in which individual local messages for each one of the local transmitters are stored together with the associated identifying data of the local transmitter and when each navigation receiver is adapted to communicate with the database in order to obtain the local message associated to the local transmitter on the basis of the identifying data received by the navigation receiver from the local transmitter. This is a very easy way to disseminate information from a central control facility because the message information is stored, managed and serviced at only one place (in the central database) instead of managing and servicing a plurality of local transmitter devices.

In another preferred embodiment of the invention the local transmitters are provided in a server-based network in which each local transmitter is connected to at least one server of the network and the network is configured such that the message content to be transmitted by a local transmitter can be uploaded from the server via the network into a memory of the local transmitter.

Preferably, the local message comprises position information (e.g. position data) of the local transmitter. This is a very easy way to determine the position of the navigation receiver receiving this message with an acceptable degree of precision. The precision of this simple local navigation concept is enhanced when the transmission range of the local transmitter is small.

As the position of the local transmitter in such a local navigation system is already known, the position data transmitted from the local transmitter can thus be transmitted as a simple local position information message from the local transmitter to the navigation receiver so that the navigation receiver can immediately display this local position information, for example on a display, without carrying out complicated calculations. The smaller the area is in which the signal transmitted from the local transmitter can be received, the more precise is the local position information received from this local transmitter. But also if the signals from more than one local transmitter are received by a navigation receiver it is possible to calculate in a simple manner the actual position of the navigation receiver between the positions of the local transmitters from which messages are received.

Local position information transmitted from the local transmitters according to the present invention is, for example, coordinates of the transmitter's position or a name or a number of a building or a room inside a building or a floor of a building. Even a position of a navigation receiver inside a larger room can be detected with a system according to this embodiment of the invention.

An alternative to directly transmitting the position data of the local transmitter is an embodiment of the present invention wherein the local position information is a message comprising identifying data of the local transmitter; wherein at least one database unit is provided in which position data for each one of the local transmitters is stored together with the associated identifying data of the local transmitter and wherein each navigation receiver is adapted to communicate with the database in order to obtain the positioning data of the local transmitter on the basis of identifying data received by the navigation receiver from the local transmitter. This embodiment allows a very effective management of the position information in a complex environment with a plurality of local transmitters even if these local transmitters cover different locations far away from each other.

A further very advantageous development of the present invention involves the local transmitter(s) being adapted to transmit orientation information and wherein the navigation receiver(s) is/are adapted to receive and output the orientation information, preferably display the orientation information on a display. Such orientation information can be, for example, an indication to a closest emergency exit of a building, which can be transmitted to the navigation receiver(s) together with e.g. a fire alarm message from the local transmitter(s). Instead of a fire alarm message, other locally relevant information may also be transmitted as a message from the local transmitter(s) to the navigation receiver(s) within the transmission range of the respective local receiver(s). Thus, the system according to such an embodiment of the present invention also allows for dynamic local information provision.

It is also advantageous when a wireless local messaging system with such a local navigation capability is integrated in a global navigation satellite system having at least one group of navigation satellites transmitting navigation information to a plurality of navigation receivers. Such a combined global and local navigation system provides for seamless navigation outside and inside of a building wherein the navigation outside is carried out with the GNSS and the navigation inside is carried out with the local navigation system.

In the case that no navigation information is received from the group of navigation satellites or in case the navigation information received from the group of navigation satellites does not allow the determination of the position of the navigation receivers and in case a local position information is received by the navigation receiver from either a local transmitter or a related database the position data (e.g. the position data of the local transmitter or of a building or a room in the building or a floor in the building) are determined on the basis of the received position information and are allotted as position data to the navigation receiver.

This new and inventive method enables GNSS receivers to receive, in addition to navigation signals from GNSS satellites, also local position data that can be directly and immediately allotted to the position of the navigation receiver without complex signal processing and complicated navigation calculations.

Preferably the position data of the local transmitter are directly retrieved from the position information.

Alternatively, identifying data of the local transmitter are directly retrieved from the position information and the position data of the local transmitter are retrieved on the basis of the identifying data from a database in which the position data are stored for each one of the local transmitters in relation to the identifying data.

Exemplary embodiments of the prevent invention are also directed to a navigation receiver. The receiver is thus configured to receive a local PRN code and to process a local message signal. The implementation of the capability to receive the local PRN code and to process a local message signal, into the software running on a navigation receiver (e.g. by a firmware upgrade) is a technical solution that can be very easily and quickly realized so that no hardware adaptation is to be carried out in already existing or new navigation receivers.

BRIEF DESCRIPTION OF THE DRAWING FIGURES

Figure 2:
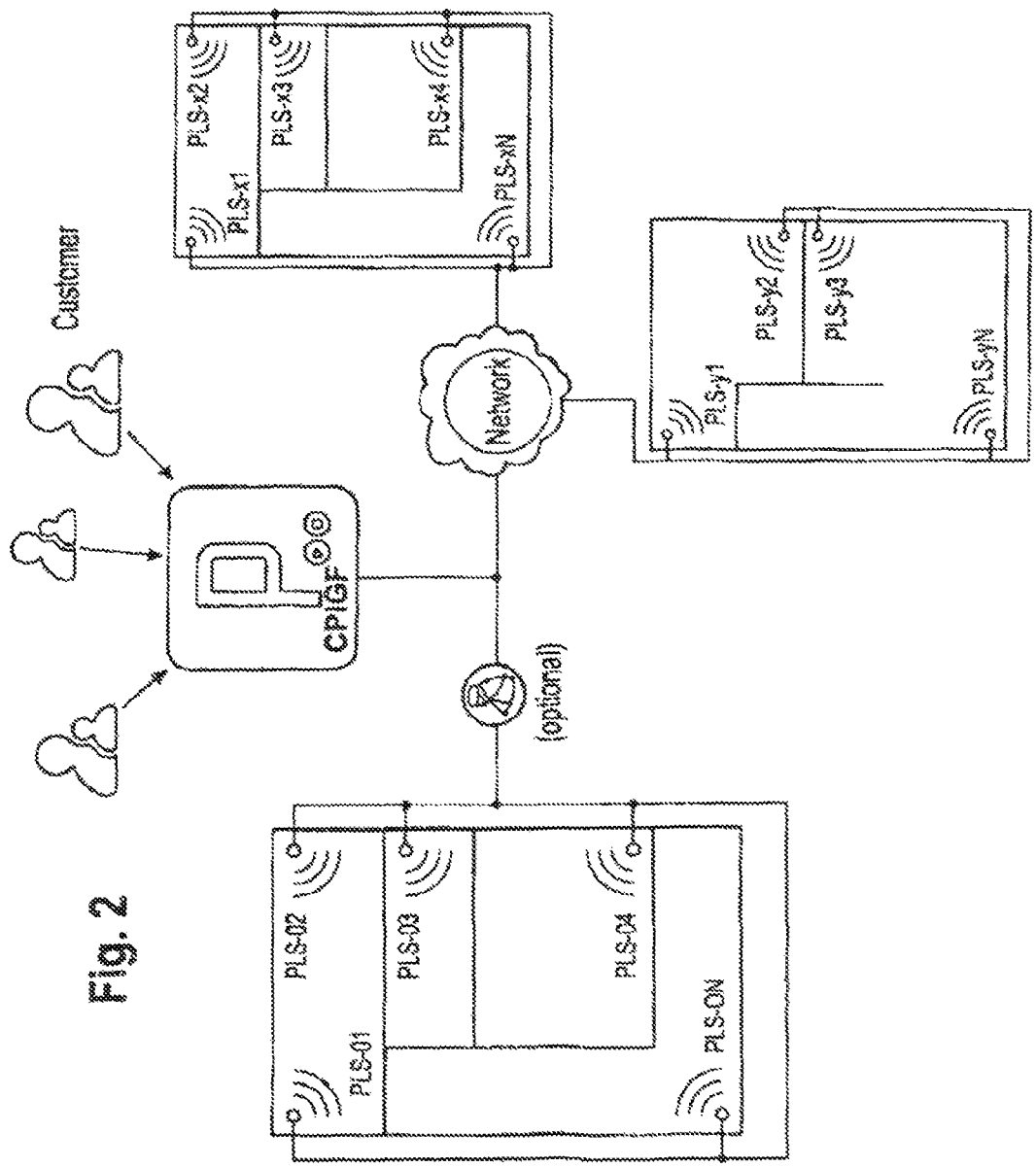

The invention is hereinafter described by example with reference to the drawings. In these drawings FIG. 1 shows an example of a wireless local messaging system according to the invention;

FIG. 2 shows an example of an architecture of a local position determining system with the wireless local messaging system of the present invention in combination with a GNSS.

DETAILED DESCRIPTION OF THE INVENTION

To provide local information to standard mass-marked devices the typical standard hardware must not be significantly changed, i.e. already existing and even already implemented technology needs to be considered.

GNSS provides great capabilities from data acquisition as well as already distributed technology point of view, since suitable GNSS receivers or chips are already deployed in many mass-market receivers and mobile devices. Furthermore locally deployable GNSS transmitters on ground (Pseudolites), together with already allocated message space for information incorporation allow for flexible data delivery even in severe environments like inside buildings, where standard GNSS satellites cannot or only be limited tracked.

FIG. 1 is a schematic drawing of a wireless local messaging system according to the present invention. This particular embodiment of the invention is designed as local navigation system integrated in a global navigation satellite system. Four visible satellites 10, 11, 12, and 13 are shown which belong to a group 1 of navigation satellites. These navigation satellites 10, 11, 12, 13 transmit navigation information that is specific to each one of the navigation satellites and which is already known in the prior art.

A fifth satellite 14 does not belong to the group 1 of navigation satellites and is for example a telecommunication satellite. This fifth satellite 14 transmits SBAS messages containing, for example, accuracy information about the signals transmitted from the navigation satellites 10, 11, 12, 13.

A navigation receiver 2 is situated in a canyon 3 between two high buildings 4, 5.

The navigation receiver 2 is provided with an antenna 20, a display 21 and a body 22 and is equipped with standard GNSS receiver hardware and software as it is known from the prior art, however, it is adapted to also receive and process local position information transmitted from local transmitters 6.

Within the canyon there is a local transmitter 6 mounted to the side wall of building 5. This local transmitter 6 is equipped with an antenna 60 adapted to transmit local message signals with arbitrary message information, however, in this shown example the message signals comprise position information that are transmitted into the canyon 3 between the two buildings 4, 5 so that the antenna 20 of receiver 2 can receive these local position information signals transmitted from transmitter 6.

The local message transmitted from the local transmitter 6 comprises local position data related to the local transmitter 6. In the present case the local position data can be, for example, the name of the street that is located in canyon 3 and the house number of building 4 and/or 5.

Thus, even if the navigation receiver 2 is not able to receive enough signals from the satellites of the group 1 of satellites, for example only signals from satellites 11, 12, and 13, which is not sufficient to calculate a position because the signals of four satellites are necessary therefor, the navigation receiver 2 is able to locate its position because the receiver 2 receives the local position information transmitted from the local transmitter 6.

The invention thus provides a new method for using standard GNSS signals and available messages to provide flexible information through Pseudolites to standard mass-market receivers and mobile devices, with minimum GNSS chip firmware upgrade requirement.

The following sections therefore describe
- the standard GNSS signals, SBAS, and Pseudolite technical background,
- a new methodology and implementation to locally and robustly disseminate flexible messages respectively information,
- a new flexible approach and design to deploy Pseudolites for flexible data dissemination,
- possible target services respectively applications enabled by the present invention, and a
- summary.

Standard GNSS Signals, SBAS, and Pseudolites Background

Several GNSS already exist or are under final development or deployment, such as GPS, GLONASS, Galileo, or Compass. Furthermore, systems to regionally augment the GNSS signals by providing suitable regional data for the relevant satellites (e.g. to support Ionosphere modelling, or to provide integrity information for the specific satellite) are already available, such as WAAS, EGNOS, or MSAS.

To limit the hardware impact on the receiver, the generated SBAS information is distributed at the same frequency that is also used by the GNSS satellite through geostationary satellites. With such an approach, any user within the relevant region is capable to receive the SBAS message with minimum software update of the GNSS receiver or chip, by searching for and acquiring the relevant SBAS satellite code, and decoding and consideration of the transmitted SBAS message. To distinguish between the standard GNSS satellites and the SBAS space transponders, dedicated codes are allocated to the SBAS satellites. For code and data modulation of the SBAS message standard binary phase shift keying (BPSK) is used.

Nowadays the most common and most distributed system is GPS that provides its civil and free-of-charge signals at the GPS L1 frequency at 1575.42 MHz. Within North America the Wide Area Augmentation System (WAAS), and over Europe the European Geostationary Navigation Overlay System (EGNOS) suitable SBAS messages are provided through related WAAS and EGNOS geostationary satellites.

The same concept can also be transferred from space to ground, i.e. to move SBAS like transponders to the ground to provide suitable messages in a local region and environment. These transponders on ground are pseudo satellites, and are accordingly called Pseudolites. Also for this approach dedicated codes are already allocated within the standard navigation message (e.g. for GPS within the relevant interface document IS-GPS-200) to allow GNSS receivers for tracking signals that are provided by such Pseudolites.

The big advantage of such locally limited environment with dedicated Pseudolites is the direct access to the message content that is provided to the GNSS receiver or mobile device that operates within the range of the Pseudolite signal. It allows for suitable local and flexible information provisioning to mobile devices, which is not limited to localization information only. For different local regions the same Pseudolite codes can be reused, as long as one receiver does not receives more than one Pseudolite with the same code.

In case of the most common GPS and the civil available L1 frequency, such signal is considered also for Pseudolites, transmitting the standard coarse/acquisition (C/A) Gold codes with code length of 1ms and a chipping rate of 1.023Mcps. Code Numbers (PRN) 64 through 119 are reserved in the relevant GPS interface documentation for future ground based augmentation system (GBAS), where 20 Gold codes are selected out of this range for Pseudolite augmentation systems.

The invention is not limited to the above described GPS signal and code characteristics, but can also be applied for other GNSS on any suitable signal respectively code.

A New Method to Robustly Disseminate Flexible Information

The general idea concerning flexible and robust information dissemination in local environments for standard mass-market GNSS receivers and mobile enabled devices is the flexible use of SBAS message formats on standard GNSS frequencies in combination with flexible steered and configurable Pseudolites, which enables flexible information receptions with minimum device update limited to GNSS firmware upgrades only.

Considering SBAS-like message schemes the invented Pseudolite message baseline data rate is 250 bits per second, with ½ convolutional encoded rate with a Forward Error Correction (FEC) code, and thus a symbol rate of 500 symbols per second, which has to be processed by the GNSS receiver.

The Forward Error Correction (FEC) applied to Pseudolite messages corresponds to the scheme presented in the SBAS Standard. The coding scheme is repeated in Table 1 for convenience.

TABLE 1

FEC parameters

| Parameter | Value |
|---|---|
| Coding Rate | 1/2 |
| Coding Scheme | Convolutional |
| Constraint Length | 7 |
| Generator Polynomials | G1 = 171o |
| | G2 = 133o |
| Encoding Sequence | G1 first |

A page is defined as the complete 250 bits, as shown in Table 2:

TABLE 2

General page format

| Symbols | Total [symbols] |
|---|---|
| 500 | 500 |

| Page | | | | Total |
|---|---|---|---|---|
| Preamble | Page Type | Data | CRC | [bits] |
| 8 | 6 | 212 | 24 | 250 |

The considered distributed preamble of the invention will be a 24-bit unique word, distributed over three successive blocks. These three 8-bit words will be made up of the sequence of bits: 01010011 10011010 11000110.

The SBAS page types 29 to 61 are reserved for future messages, and page type 51 is selected for Pseudolite-based messages. In case of a Pseudolite message with page type: 0b110011, the first 10 bits of the data field are reserved for the data type identifier (Table 3). This allows distinguishing between different Pseudolite messages.

TABLE 3

Pseudolite page

| | Page | | | |
|---|---|---|---|---|
| Preamble | Page Type 51 (0b110011) | Data Type ID | Data | CRC |
| 8 bit | 6 bit | 10 bit | 202 bit | 24 bit |

A CRC of 24 bits shall be generated from the following generator polynomial:

$$G(X) = (1+X) * P(X)$$

where $P(X)$ is the primitive and irreducible polynomial with the following definition:

$$P(X) = X23 + X17 + X13 + X12 + X11 + X9 + X8 + X7 + X5 + X3 + 1$$

The CRC shall be composed of a sequence of 24 parity bits pi with the following values. For any i from 1 to 24, pi is the coefficient of X24−i in R(X), where:

R(X) is the remainder of the binary polynomial algebra division of the polynomial m(X)·X24 by G(X)

m(X)=m1Xk−1+ . . . +mk−2X2+mk−1X+mk with m1, m2, . . . mk the sequence of k-bits information to be protected by the CRC, and m1 as the MSB.

To ensure robust and flexible Pseudolite message processing the data field (212 bits) of the new invented methodology starts with a data type identifier coded on 5 bits to define the type of data transmitted in the data field, which allows for 25=32 different Pseudolite message types.

In order to increase robustness against bit errors each bit of the data type identifier is repeated twice, e.g. the data type identifier field width is 10 bits instead of 5 bits. The result is that a "0" data type identifier bit is replaced by '00' and a "1" is replaced by '11'.

TABLE 4

Pseudolite page

Data Type Identifier

| ID [decimal] | Binary | Definition |
|---|---|---|
| 0 | 0000000000 | Pseudolite under test/Do not use Pseudolite |
| 1 . . . 30 | 0000000011 . . . 1111111100 | Reserved for future messages |
| 31 | 1111111111 | Beacon ID message |

The Data Type Identifier (Table 4) defines how to interpret the remaining 202 data bits. Through decimal IDs 1 to 30 flexible messages can disseminated to the user and related information can be provided accordingly (e.g. fire alerts, guiding or local information and directions, etc.).

ID 31 provides the dedicated beacon message, and the 202 bits available are used for the invention to define the local unique Pseudolite identifier, linked to a position e.g. accessible to the user through an external database.

The first three characters (24 bits) indicate the ISO 3166 ALPHA-3 country code (for example the country code of Germany is 'DEU'='0x444555'), followed by the next 176 bits containing the Pseudolite identifier (PSL-ID). The remaining 2 bits are spare bits and set to '01'.

The Pseudolite identifier shall be coded on 22 bit (Table 5), which allows for 222=4194304 Pseudolites per country code within the database. In order to take advantage of the 176 bits bandwidth, each bit of the Pseudolite identifier field is repeated 8 times in order to increase robustness against bit errors. The result is that a "0" PSL-ID data bit is replaced by '00000000' ('0x00') and a "1" is replaced by '11111111' ('0xFF').

TABLE 5

Pseudolite page

| 22 Byte PSL-ID (HEX) | Definition |
|---|---|
| 00 00 00 00 00 00 00 00 00 00 00<br>00 00 00 00 00 00 00 00 00 00 00 | PSL-ID0 |
| 00 00 00 00 00 00 00 00 00 00 00<br>00 00 00 00 00 00 00 00 00 00 FF | PSL-ID1 |
| 00 00 00 00 00 00 00 00 00 00 00<br>00 00 00 00 00 00 00 00 00 FF 00 | PSL-ID2 |
| 00 00 00 00 00 00 00 00 00 00 00<br>00 00 00 00 00 00 00 00 00 FF FF | PSL-ID3 |
| ... | PSL-ID ... |
| FF FF FF FF FF FF FF FF FF FF FF<br>FF FF FF FF FF FF FF FF FF FF 00 | PSL-ID4194302 |
| FF FF FF FF FF FF FF FF FF FF FF<br>FF FF FF FF FF FF FF FF FF FF FF | PSL-ID4194303 |

The data field including the beacon ID message can be summarised as shown in Table 6.

TABLE 6

Data field with Beacon ID message

| Data | | | | |
|---|---|---|---|---|
| Data type Identifier = '1111111111' | Country Code | PSL ID | Spare = '01' | Total [bits] |
| 10 | 24 | 176 | 2 | 212 |

Considering the overall objective to invent a flexible local Pseudolite message based on SBAS standard message schemes, such invented approach fully supports flexible and robust information dissemination for standard mass-market receivers and mobile devices.

A New Flexible Approach to Deploy Pseudolites for Flexible Data Dissemination

A commonly known and used Pseudolite approach considers these GNSS transmitters on ground to provide additional ranging signals to any user within the tracking range of the Pseudolite. Each of the Pseudolites itself hereby is configured to transmit or generates the relevant information (PRN, message content, etc.) that is coded onto the transmitted signal to be provided to the user.

The invention considers a new different approach to use Pseudolites only, i.e. without additional GNSS information, still based on standard allocated codes and available message schemes, but with a centralized and flexible configuration of each transmitter to allow for flexible Pseudolite configuration, as well as flexible message content dissemination.

Such design removes and respectively shifts software complexity and know-how from each unit to the central processing and information generation facility (CPIGF), and also reduces Pseudolite hardware complexity (and associated costs). The original smart Pseudolite becomes a hardware slave only called Pseudolite Slave (PLS). The ranging capability is no longer required through the unique ID (flexible configurable through the CPIGF) provisioning, linked to a unique location through external databases. It can however be maintained and considered.

FIG. 2 illustrates the high-level architecture of the invention consistent of CPIGF and various PSL.

This approach with significantly reduced PLS complexity by increased flexibility allows for PSL miniaturization and mass-market production, to allow for complex environment equipping (e.g. in large buildings).

Furthermore, the flexible configuration through a CPIGF, which does not need to be located within the same building (e.g. optional through internet connection), or does not even need to be allocated and responsible for this one environment (building) only, allows for flexible and cost efficient implementation. The configuration would typically be realized through standard network connections between CPIGF and PLSs or PLS-clouds. Depending on the CPIGF location, intermediate router knots need to be implemented to properly disseminate the current configuration to each PLS.

In case of architecture or design/implementation updates, e.g. additional transmitters or cloud extension considering additional buildings or floors, or mission modifications like message type or PSL ID changes, complex upgrades, for example for each PLS, are not required. Those updates would typically be requested from the final customers, and are easily implemented and respectively propagated through the CPIGF with configuration modifications, i.e. without the need for any additional complex and cost intensive upgrades. In such environment different frequencies could also be considered since the cheap mass-market approach using already available GNSS technology might not apply.

Target Services and Application Enabling

The invention allows for local distribution of flexible information that is robustly receivable through standard mass-market GNSS receivers and mobile devices, even in situations where GNSS tracking is typically not possible or much degraded, like inside buildings.

Through the centralized configuration of the ground transmitters, called Pseudolite Slaves (PLS), the PSL ID as well as the provided information can be flexible and in real-time be changed, which allows for a variety of services and possible applications, like:

- indoor location awareness through PSL ID recognition and PSL location knowledge through external databases (e.g. acquired through WiFi service provision)
- local information provisioning like distance or way to next exit (knowing the location of the received PSL ID), or train departure information if the invention considered within typical train environments (reception of PSL ID triggers station entry event), dedicated WiFi link provisioning for local 3D maps or coupon download for close stores, etc.
- GNSS like or other suitable ranging information to enable accurate device localization, also in combination with other visible (receivable) PSL signals
- alert dissemination in case of emergency through special alert code, configurable and to be triggered in real-time by the CPIGF.

Those and other considerations of the invention will enable a variety of services that can be easily installed into the mass-market devices, but are not limited to these mass-markets. The same methods can be applied in higher-security environments e.g. considering more complex and secure transmission as well as tracking devices (e.g. including encryption), steered and configured from a CPIGF located in a relevant save and secure location, interfacing with the slaves through secure connections.

The invention provides a method to flexibly distribute configurable information to standard mass-market GNSS receivers and mobile devices (but not limited to those) through ground transmitters, enabling the robust reception of localization and other relevant information even in severe environments like inside buildings.

This is achieved by locally disseminating standard GNSS signals and applying commonly known and distributed message schemes, which can be configured and in real-time be adapted from a central facility. This facility can operate a dedicated set of ground transmitters (cloud) or various sets of clouds.

A mobile device entering the range of the dedicated transmitter (which is also flexibly configurable) immediately receives the unique ID of the transmitter plus additional embedded information, and can consider such information for its dedicated mission, like localization within a building (e.g. which floor close to which elevator), retrieve car parking position information, get train connection information, etc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 group of navigation satellites
2 navigation receiver
3 canyon
4 high building
5 high building
6 local transmitter
10 visible satellite
11 visible satellite
12 visible satellite
13 visible satellite
14 satellite
20 antenna
21 display
22 body
60 antenna

The invention claimed is:

1. A wireless local messaging system, comprising:
at least one transmitter; and
at least one receiver, wherein the at least one transmitter is configured to transmit a local message and a local PRN code to the at least one receiver;
wherein said at least one receiver is a navigation receiver configured to receive and process navigation messages from satellites of a global navigation satellite system on a particular carrier frequency, each of the satellites transmitting the navigation messages with a satellite-individual PRN code,
wherein the at least one transmitter is configured to transmit the local message and the local PRN code in a local message signal on the particular carrier frequency,
wherein the at least one receiver is further configured to receive and process the local message signal in order to determine the local PRN code and the local message,
wherein the local PRN code is not used by a satellite of said global navigation satellite system, and
wherein the local message comprises information for a non-global-navigation-satellite-system service.

2. The wireless local messaging system according to claim 1, wherein the local message signal is a non-continually transmitted pulsed signal.

3. The wireless local messaging system according to claim 1, wherein the at least one transmitter comprises a plurality of local transmitters, the system further comprising:
at least one database unit configured to store individual local messages for each one of the plurality of local transmitters together with the associated identifying data of one of the plurality of local transmitters,
wherein each of the at least one navigation receiver is configured to communicate with the at least one database unit in order to obtain the local message associated with one of the plurality of local transmitters on the basis of the identifying data received by the at least one navigation receiver from the one of the plurality of local transmitters.

4. The wireless local messaging system according to claim 3, wherein
the plurality of local transmitters are arranged in a server-based network in which each of the plurality of local transmitters is connected to at least one server of the network and
the network is configured such that the message content to be transmitted by one of the plurality of local transmitters is uploaded from the at least one server via the network into a memory of the one of the plurality of local transmitters.

5. The wireless local messaging system according to claim 3, wherein the local message comprises position information of one of the plurality of local transmitters.

6. The wireless local messaging system according to 1, wherein the system is integrated in a global navigation satellite system having at least one group of navigation satellites configured to transmit navigation information to the at least one navigation receiver.

7. The wireless local messaging system according to claim 1, wherein the local message is configured and in real-time adapted from a central processing and information generation facility connected to the at least one transmitter via a network.

8. The wireless local messaging system according to claim 1, wherein if no navigation information is received from a group of navigation satellites and position information of one of the at least one transmitter is received by the navigation receiver from either the at least one transmitter or a related database, the position data of the at least one transmitter are determined on the basis of the received transmitter position information and are allotted as position data to said navigation receiver.

9. The wireless local messaging system according to claim 8, wherein the position data are determined for a plurality of transmitters, and
the position data are combined to determine the location of the receiver.

10. The wireless local messaging system according to claim 1, wherein the non-global navigation satellite system service comprises determining an indoor location of the receiver.

11. The wireless local messaging system according to claim 1, wherein the non-global navigation satellite system service comprises provisioning of local information.

12. The wireless local messaging system according to claim 1, wherein the non-global navigation satellite system service comprises disseminating an alert to the receiver.

13. A method for receiving a local message in a navigation receiver comprising:
- receiving and processing a local PRN code and a local message from at least one of a plurality of local transmitters,
- determining a position of the at least one of the plurality of local transmitters using the received local message or local position information received from a database when no navigation information is received from a group of navigation satellites or when navigation information received from the group of navigation satellites does not allow determination of the position of the navigation receiver,
- wherein the received local message or the local position information comprises position data, and
- wherein the local message comprises information for a non-global-navigation-satellite-system service.

* * * * *